UNITED STATES PATENT OFFICE.

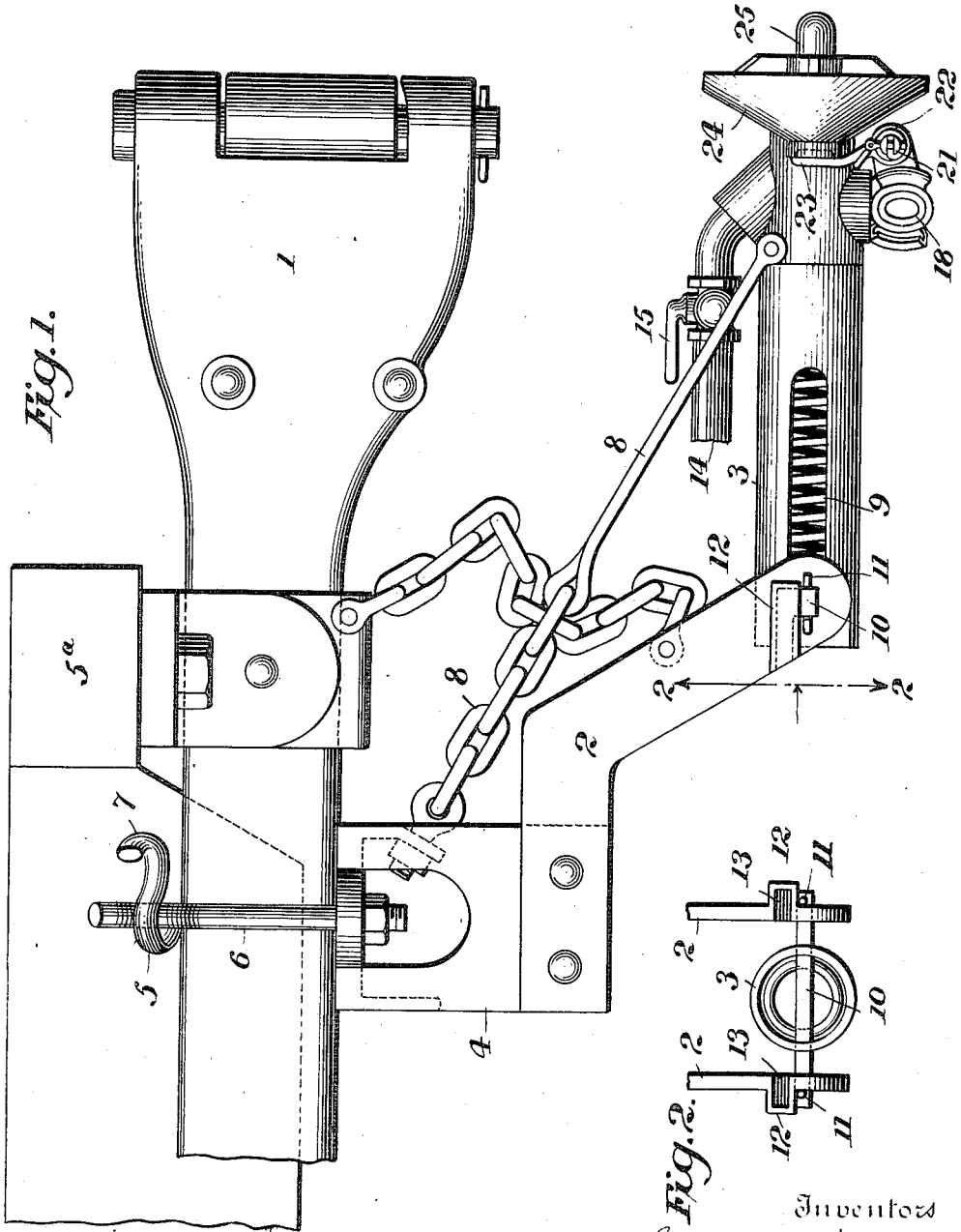

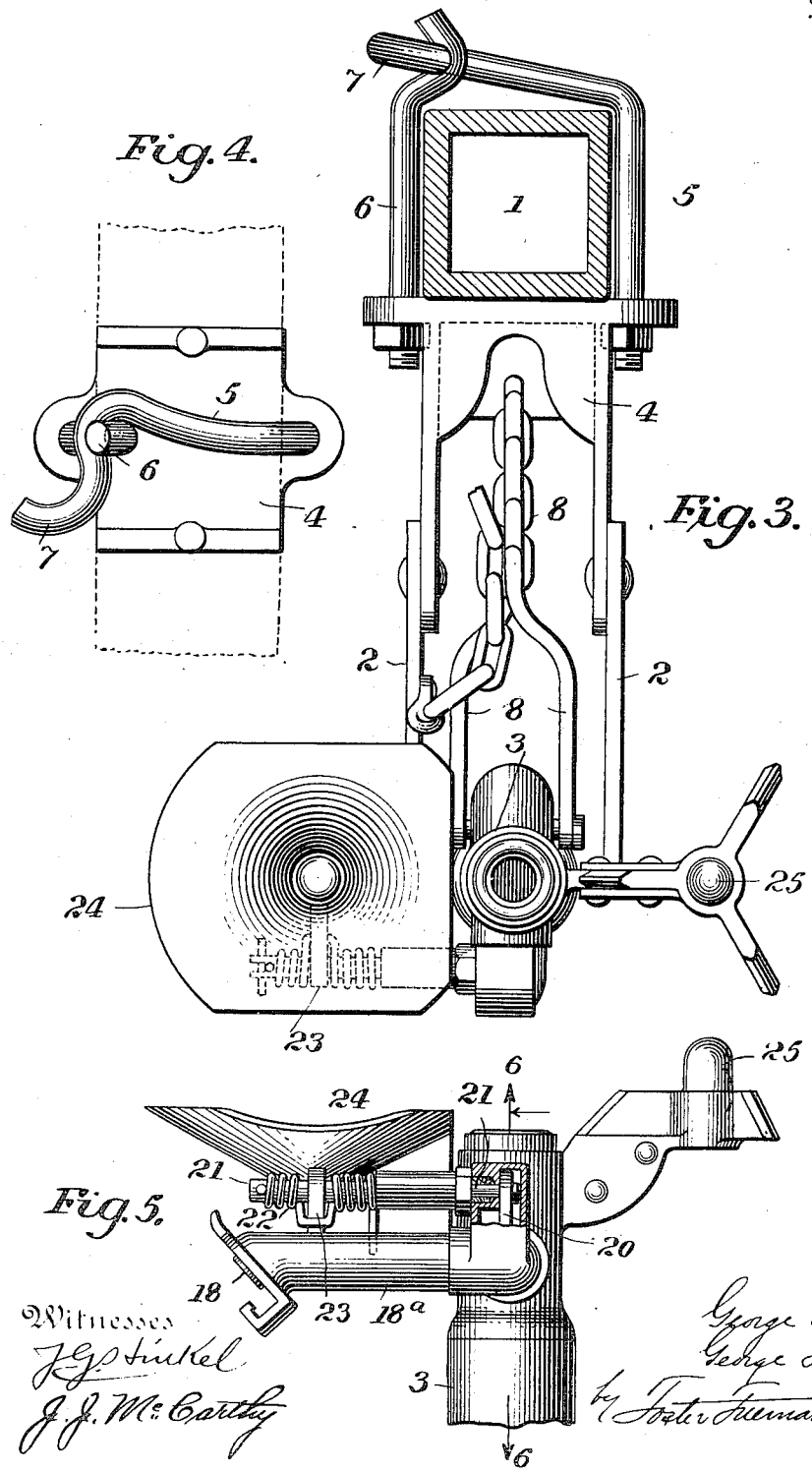

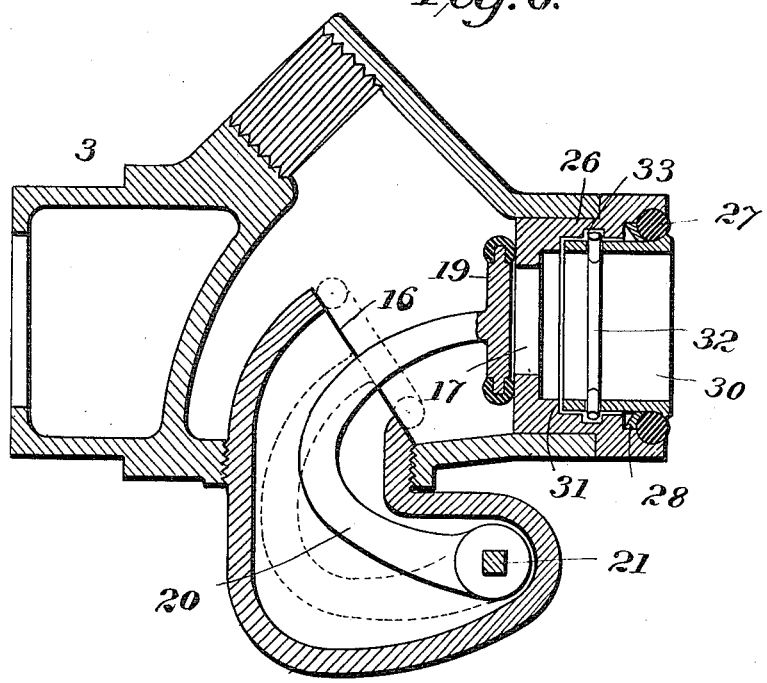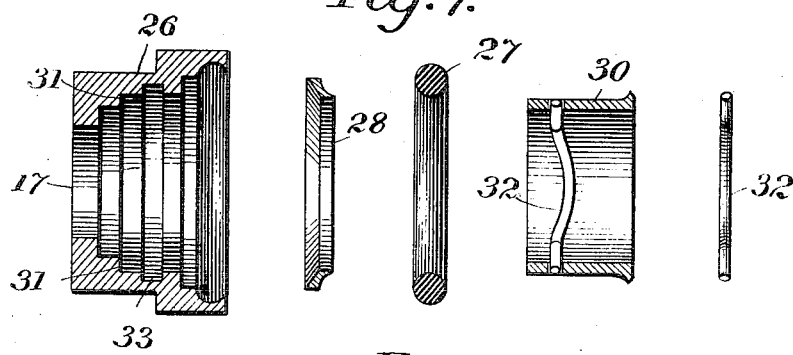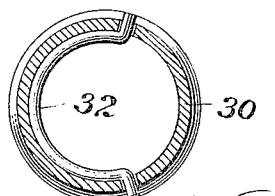

GEORGE E. KELLY AND GEORGE F. ROYER, OF WILKES-BARRE, PENNSYLVANIA, ASSIGNORS TO THE KELLY-ARNOLD MANUFACTURING CO., OF WILKES-BARRE, PENNSYLVANIA, A CORPORATION OF PENNSYLVANIA.

TRAIN-PIPE COUPLING.

983,239.  Specification of Letters Patent.  Patented Jan. 31, 1911.

Application filed March 5, 1909. Serial No. 481,258.

*To all whom it may concern:*

Be it known that we, GEORGE E. KELLY and GEORGE F. ROYER, citizens of the United States, and residents of Wilkes-Barre, in the county of Luzerne and State of Pennsylvania, have invented certain new and useful Improvements in Train-Pipe Couplings, of which the following is a specification.

The present invention relates to improvements in train pipe couplings and among the objects of the invention, the following may be noted. To provide a coupling which is adapted to coöperate with a similar coupling or head, or with the ordinary hand-operated hose coupling commonly employed on railway cars in connection with the fluid pressure brake mechanism. Secondly, to provide improved means for supporting a coupling or member of a train pipe coupling in such manner that it will not be damaged or torn from the car in case the draft coupler of the car is pulled from its support on the car, as frequently happens.

Further, the invention relates to the manner of connecting the pipe coupling with its supporting means and the manner of supporting a suitable gasket within a port or fluid passage in the coupling.

To effect the first of the above mentioned objects, each coupling head of a train pipe coupling constructed in accordance with the present invention, is suitably connected with a fluid pressure pipe or duct having therein a valve adapted to be manually adjusted and said head is provided with two outlets or ports, one of which communicates with a hose coupling. The head is provided with suitable guiding means adapted, by coöperation with means on the opposing head, to bring the ports which are not directly connected to the hose coupling in alinement when said heads are brought together, and each head is provided with a valve normally closing the port therein, which is not connected with the hose coupling, said valve being automatically shifted to open the port normally closed thereby and close the port with which the hose coupling directly communicates when the head is coupled to a similar head.

In the accompanying drawings: Figure 1 is a side elevation of a railway car draft coupler and one member of a train pipe coupling, the latter being constructed and supported in accordance with the present invention; Fig. 2 is a detail view taken partly in section on the line 2—2 of Fig. 1; Fig. 3 is a front elevation of the parts shown in Fig. 1; Fig. 4 is a plan view of the connection between the draft coupler and the train pipe coupling; Fig. 5 is a view of the lower face of the head of the coupling; Fig. 6 is a sectional view through a portion of the coupling head, substantially on the line 6—6 of Fig. 5; Fig. 7 illustrates the bushing, gasket and interlocking means employed within one of the ports of the coupling head; and Fig. 8 is a detail sectional view.

Referring to the drawings, 1 designates a member of a suitable draft coupler which is supported from the frame of a railway car in any desired manner. From said coupler are supported parallel hangers 2 between which extends the stem 3 of a train pipe coupling. As shown, the hangers 2 are secured to a block 4 which is supported by rods 5, 6, that extend upwardly on opposite sides of the stem of the draft coupler 1. At points above the stem of the draft coupler said rods 5, 6 are bent in opposite directions to project over said stem and the rod 5 is bent again so that said rods are interlocked and the coupling supporting brackets 2 thereby normally held from vertical movement relative to the draft coupler. The free end of the rod 5 is projected laterally beyond the side of the stem of the draft coupler and in such position that it is adapted to contact with an abutment $5^a$ on the frame of the car in case the draft coupler is withdrawn longitudinally from its supports on the car as frequently happens when said coupler is subjected to a sudden very heavy pull or strain. In such event, the rods 5 and 6 will be disengaged as the member 7 of the rod 5 contacts with said abutment on the car and thereby the coupling supported by the hangers 2 will be released from the draft coupler. A suitable chain or other connection between the coupling and the car frame, may be provided to prevent the coupling from falling to the ground when thus disengaged or detached from the draft coupler. A suitable chain and link connection 8 is preferably provided between the block 4 and the head of the pipe coupling, such additional or auxiliary support being preferably connected with the block by a screw and nut, as shown in Fig. 1.

The stem 3 of the train pipe coupling is preferably slotted longitudinally as at 9 and through said slots is adapted to extend a cross bar or plate 10, the ends of which are adapted to extend through openings or slots in the hangers 2. Through said cross bar or plate adjacent its ends are passed pins 11, which, by contacting with laterally projected members 12 of the hangers 2, prevent vertical movement of said bar or plate. The inner faces of said lateral projections 12 are cut away to provide grooves 13 that open through the edges of the hangers opposite the head of the train pipe coupling. Therefore when the pins 11 are removed, the plate or bar 10 may be lifted into said grooves 13 and then by a rearward movement of the coupling, said bar or plate will be shifted through the grooves 13 until disengaged from the hangers 2.

A suitable coiled spring is preferably arranged within the stem 3 between an abutment connected with the cross bar or plate 10, and the head of the train pipe coupling. This spring acts to normally hold the parts in the relative position shown in Fig. 1 and will be compressed when the coupling head is engaged with a similar head on another car, as will be understood.

The head of the train pipe coupling is connected with a suitable train pipe or duct 14, having therein a manually operable valve 15, and said head has formed therein two ports or outlets 16, 17, the former of which is connected with a hose coupling 18, adapted to be engaged with the ordinary hose coupling on fluid pressure brake apparatus. As shown, this coupling 18 is formed at the outer end of a pipe or duct 18ª which is rigidly connected with the coupling head, the port 16 being formed at the inner end of a branch or lateral projection on said pipe.

A valve 19, supported by an arm 20 on a rock shaft 21 mounted in bearings on the coupling head, is normally held by the action of a spring 22 in the position in which it closes the outlet or port 17. One end of the spring 22 bears against the pipe 18ª and the other end is attached to the rock shaft 21. At an intermediate point in its length this spring extends across an arm or finger 23 which is loosely mounted on the rock shaft 21 and projects therefrom in such position that it will be engaged by a projection or member on a similar coupling head as the two heads are brought together for the purpose of bringing the ports 17 thereof into alinement. This causes a rocking of the shaft 21 and shifts the valve 19 into the dotted position shown in Fig. 6, thus opening the port 17 and closing the port 16 that communicates directly with the hose coupling 18. The two heads of the coupling being thus related and the ports 16 closed, the brakeman by opening the valves 15, brings the train pipes on the two cars into communication through said ports 17.

In case it is necessary to couple a car having a train pipe coupling constructed in accordance with the present invention, with a car having merely the ordinary hand hose coupling, the latter is engaged with the coupling 18 and as the spring 22 holds the valve 19 in position to close the port 17, the train pipes on the two cars will be connected through the port 16 and hose coupling 18 when the valve 15 is open.

In the embodiment of the invention illustrated, the coupling head, is provided at one side with a funnel-shaped guide 24 and at the opposite side with a pin 25 adapted to coöperate with the funnel guide 24 on a similar head; and the finger or arm 23, on the valve actuating rock shaft 21, extends across the aperture or opening formed at the reduced end of the funnel-shaped guide member. Therefore, when two coupling heads, such as are herein shown, are brought together, the pin 25 on each will move the arm or finger 23 of the other and thereby automatically shift the two valves 19 away from their normal position across the ports 17 and cause said valves to close the ports 16.

As shown, a suitable bushing 26 is secured within the port 17 of the coupling head, and adjacent the outer end thereof is formed a concave seat into which is fitted a gasket. The inner seat for the gasket 27 is formed partially by a groove in the inner face of the bushing 26 and partly by a ring 28 which is arranged in a groove 29 in the bushing; and through the gasket extends a sleeve 30, the inward movement of which is limited by a shoulder 31 within the bushing. A bowed spring or locking member 32 is adapted to retain the sleeve within the bushing while permitting a limited movement thereof longitudinally. The length of the spring locking member 32 is greater than the diameter of the sleeve 30 and in order that the latter may be introduced into the bushing, said locking member is turned into the position indicated in Fig. 7, in which position its ends will lie substantially flush with the outer surface of the sleeve. After the sleeve has been inserted in the bushing a slight pressure on the body of the locking member 32 will shift it into the position indicated in Fig. 6, where it extends directly transverse of the diameter of the sleeve and thereby the ends thereof will be projected into a groove 33 formed in the bushing. By exerting a slight pull on the portion of the locking device 32 within the sleeve, it may be shifted into the inclined position indicated in Fig. 7, thereby withdrawing its ends from engagement with the bushing and permitting the sleeve to be withdrawn and the gasket released. It will be seen that the locking member 32 does not completely fill the groove 33 and that there is a slight space between the adjacent walls of the sleeve and bushing. When the coupling is in use and the port 17 thereof is operative the pressure of fluid within the coupling head acts against the ring 28 and through it against the gasket 27 which is thus held in close contact with the bushing and sleeve and against the gasket or face of the opposing coupling.

No claim is herein made to the particular construction of gasket or means for supporting the same which is illustrated in the drawings and described in the foregoing specification.

Having thus described the invention, what is claimed is:

1. In a train pipe coupling, the combination of a head having therein two ports, a hose coupling communicating with one of said ports, means normally closing the other port, and means for automatically opening the last said port and closing the port communicating with the hose coupling when said head is engaged with a similar head.

2. In a train pipe coupling, the combination with a head having two outlets, of a valve normally closing one of said outlets, a hose coupling communicating with the other outlet, and means for automatically shifting the valve to a position where it will close the other outlet in said head when the latter is engaged with a head having a port adapted to aline with the port normally closed by the valve.

3. In a train pipe coupling, the combination with a head having two outlets, of a valve adapted to close either of said outlets, a hose coupling connected with the head and communicating with one of said outlets, means acting to normally maintain the valve in position to close the outlet which is not connected with the hose coupling, and means for automatically shifting the valve to close the outlet communicating with the hose coupling when the head is engaged with a similar head.

4. In a train pipe coupling, the combination of a head having two outlets, one opening through the end face of the head and the other through a lateral or side face, a hose coupling connected with the last said outlet, and a valve adapted to close either of said outlets.

5. In a train pipe coupling, the combination of a head having two outlets, one opening through an end face of the head and the other through a lateral or side face, a hose coupling connected with the last said outlet, and a valve arranged within the head and adapted to close either of said outlets.

6. In a train pipe coupling, the combination of a head having two outlets, one opening through an end face of the head and the other through a lateral or side face, a hose-coupling connected with the last said outlet, a valve arranged within the head, and adapted to be adjusted to close either of the outlets therefrom, means acting to normally hold the valve in position to close the outlet in the end face thereof, and means whereby when two of such heads are positioned to bring the outlets in the end faces thereof into alinement the valve will be automatically shifted to close the outlet connected with the hose coupling.

7. In a train pipe coupling, the combination of a head having two outlets, one opening through an end face of the head and the other through a lateral or side face, a hose coupling connected with the last said outlet, a valve adapted to close either of the outlets, means normally holding the valve in position to close the outlet in the end face of the head, and means connected with the head and adapted when two similar heads are brought together to cause the valve in the other head to move into position to open the previously closed outlet and close the one connected with the hose coupling.

8. In a train pipe coupling, the combination of a head having two outlets or ports, a hose coupling communicating with one of said ports, a rock shaft mounted in bearings on the head, a valve connected with the shaft and adapted to be moved thereby to close either of said ports, a spring acting to normally hold said shaft and valve in position to close the port which is not connected with the hose coupling, and means connected with the shaft and extending into the path of movement of a member on another connector head as the two heads are brought together, whereby the valve will be automatically shifted to open the port previously closed thereby and close the port communicating with the hose coupling.

9. In a train pipe coupling, the combination of two heads each adapted to be connected with a train pipe and having therein two outlets or ports, a hose coupling connected with each head and communicating with one of the ports therein, members projecting from each head and adapted to coöperate to bring the ports which are not directly connected with the hose couplings into alinement when said heads are coupled, means in each head for normally closing the last said ports, and means adapted to be actuated by said guiding members for shifting said closing means to open the ports normally closed thereby and close the ports directly connected with the hose couplings as said heads are coupled.

10. The combination with the draft coupler of a railway car, of a train pipe coupling member supported from the draft coupler by a hanger including a yoke having its members interlocked above the stem of the draft coupler and adapted to be disengaged if the draft coupler is drawn from its support on the car.

11. The combination with the draft coupler of a railway car, of a train pipe coupling member, and a hanger comprising a member connected with the pipe coupling, and two bars or rods extending upwardly from said member on opposite sides of the stem of the draft coupler and having their upper ends interlocked above said stem, the connection between said rods or bars being automatically broken if the draft coupler is drawn from its support on the car.

12. The combination with the draft coupler of a railway car, of a train pipe coupling member, a hanger comprising a member connected with the pipe coupling, and two bars or rods extending upwardly from said member on opposite sides of the stem of the draft coupler, one of said rods being bent to extend across said stem and interlock with the other and having a portion extending forwardly in alinement with an abutment on the car, whereby if the draft coupler is drawn from its support on the car, said rods will be disengaged and the train pipe coupling released from the draft coupler.

13. The combination with a train pipe coupling including a head and a suitable stem, of a support comprising two arms between which the stem of said coupling extends, each of said arms having a horizontal groove opening through one edge thereof and communicating at its opposite end with a downwardly extending recess, and a cross bar extending through a slot in the stem of the coupling and having its ends within said recesses and adapted to pass through the grooves in the supporting arms when in alinement therewith.

14. The combination of a train pipe coupling member including a head and a longitudinally slotted stem, a coiled spring arranged between the head and an abutment extending into the slotted stem, and a hanger or support extending on opposite sides of the slotted stem, and adapted to engage means connected with the abutment, the parts being so connected that the coupling, spring, and said abutment may be withdrawn from the hanger or support without being disconnected.

15. The combination of a train pipe coupling member including a head and a longitudinally slotted stem, a bar extending transversely through the slotted stem and supporting a suitable abutment therein, a coiled spring arranged between said abutment and the head of the coupling, and a hanger or support adapted to receive the ends of said bar and permit the latter, the coupling, the spring and said abutment to be withdrawn without being disconnected.

16. The combination with a train pipe coupling including a head and a longitudinally slotted stem, of two supporting arms extending on opposite sides of said slotted stem, a cross bar or plate adapted to extend through alined apertures in said arms and the slotted stem, each arm having an outwardly extending projection the inner face of which is grooved and communicates with said aperture, said projection and groove extending to one edge of the supporting arms, means detachably engaging the ends of the cross bar and coöperating with said projections on the supporting arms to prevent the bar from being shifted into the grooves in said arms, and a coiled spring arranged between the cross bar and the head of the coupling member.

17. The herein described train pipe coupling comprising two heads each adapted to be connected with a section of the train pipe of a fluid pressure brake apparatus and when coupled together to provide a passage or duct between the sections of train pipe connected thereto, each head having means normally closing said duct or passage, hose couplings normally communicating with the sections of the train pipe connected with said head, and means for automatically opening said duct or passage and closing the connections between the hose couplings and train pipe as said heads are coupled.

18. The herein described train pipe coupling comprising two heads each adapted to be connected with a section of the train pipe of a fluid pressure brake apparatus and when coupled together to provide a passage or duct between the sections of train pipe connected thereto, each head having means normally closing said duct or passage, hose couplings connected with each head and normally communicating with the sections of the train pipe connected with said head, and means for automatically opening said duct or passage and closing the connections between the hose couplings and train pipe as said heads are coupled.

19. In a train pipe coupling, the combination of a head adapted to be connected with a section of the train pipe of a fluid pressure brake apparatus and having a suitable port, a hose coupling normally communicating with the section of train pipe connected with said head, and means normally closing said port in the head and adapted to automatically close the connection between the hose coupling and train pipe when adjusted to open said port.

In testimony whereof we affix our signatures in presence of two witnesses.

GEORGE E. KELLY.
GEORGE F. ROYER.

Witnesses:
JOHN J. O'DONNELL,
THOMAS A. McANDREWS.